Sept. 15, 1942.  C. G. WILLIAMSON  2,295,616
PROBABILITY COMPUTER
Filed March 23, 1940  2 Sheets-Sheet 1

INVENTOR
CHARLES G. WILLIAMSON
BY
ATTORNEYS

Sept. 15, 1942.　　C. G. WILLIAMSON　　2,295,616
PROBABILITY COMPUTER
Filed March 23, 1940　　2 Sheets-Sheet 2
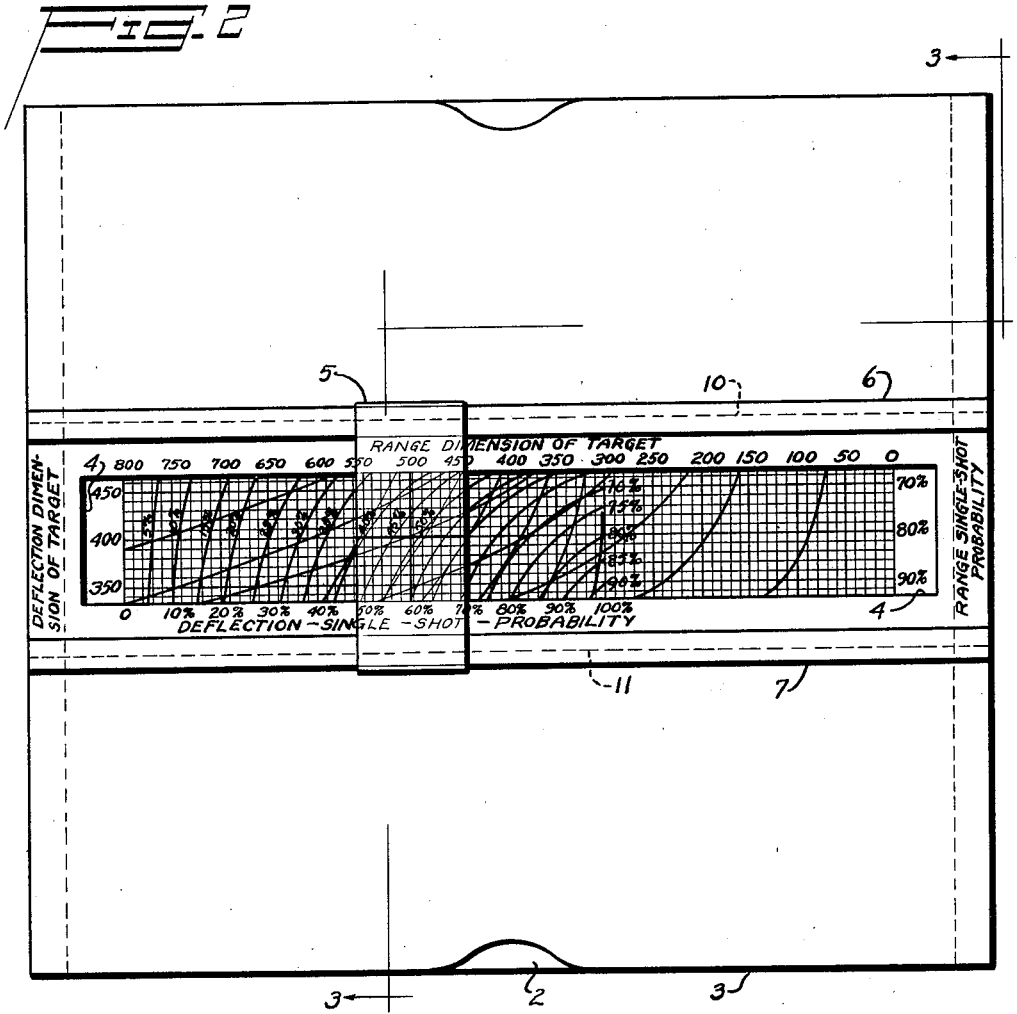
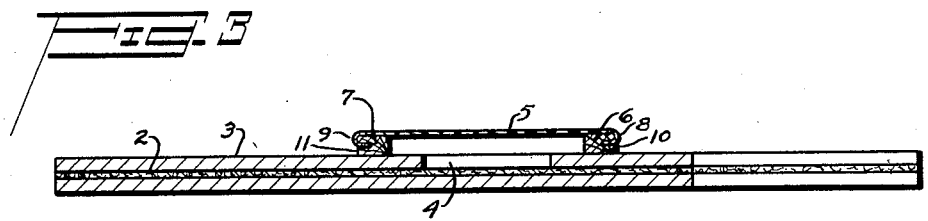
INVENTOR
CHARLES G. WILLIAMSON
BY
ATTORNEYS Patented Sept. 15, 1942

2,295,616

UNITED STATES PATENT OFFICE 2,295,616

PROBABILITY COMPUTER

Charles G. Williamson, Sacramento, Calif.

Application March 23, 1940, Serial No. 325,660

2 Claims. (Cl. 235—61.5)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a computer for readily determining the probability of hitting a target of certain dimensions with a bomb or bombs dropped from aircraft.

Many factors affect the accurate laying of bombs on targets. Among these are physical characteristics of the bombs, such as size and weight; variations in airplane speed at the time of bomb release; setting of the bomb sights; aiming; action of the airplane and the bomb rack; and atmospheric conditions.

It is an object of this invention to provide a calculator for rapidly solving the probability problem in aerial bombing.

It is another object of this invention to provide a device by means of which the probability of success of a bombing mission may be readily estimated.

In the drawings:

Figure 2 is a plan view of a modified form of calculator; and

Figure 3 is a cross-sectional view taken along the lines 3—3 of Figure 2.

Figure 1:
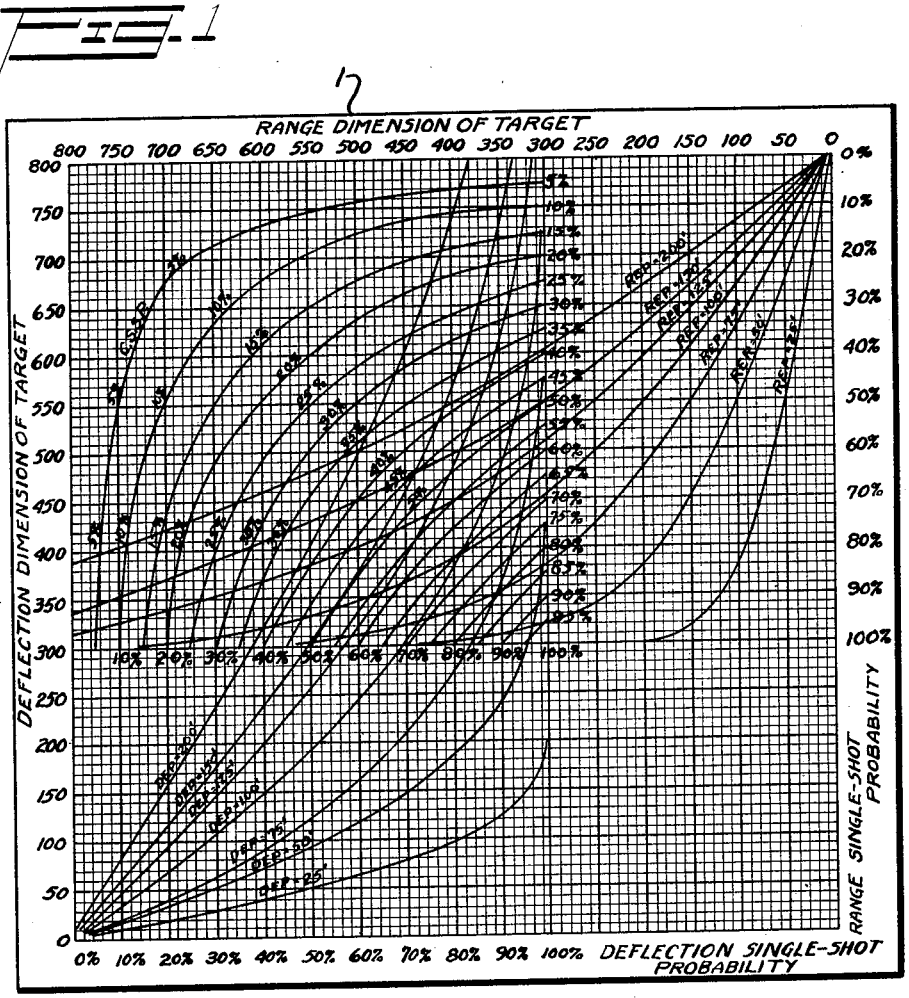
Figure 1 is a plan view of one form of calculator constructed in accordance with this invention.

Reference is made to "Ordnance and Gunnery" by McFarland, chapter 15, for a more complete dissertation on probability with respect to projectiles.

In the following description, the nomenclature used may be defined as follows: The range dimension of the target is the target dimension in the direction of approach and the deflection dimension is the target dimension normal to the range dimension.

Since the accuracy of bomb dropping is affected, as previously pointed out, by many factors, a certain percentage of bombs dropped under seemingly identical conditions will be dispersed in a pattern around the target. The distance of each bomb from the center of the target is the absolute deviation of the bomb. The mean absolute deviation of the group of bombs is obtained by dividing the numerical sum of the deviations by the number of bombs. The average error of deviation of range and deflection is obtained from the mean absolute deviation of variable numbers of bombs dropped by different bombardiers at different elevations and under different atmospheric conditions and airplane speeds.

The average error of deviation is preferably obtainable from the average errors in range and deflection (Rea and Dea respectively) obtained for each altitude from the previous bombing records of the unit or individual for which the probability is being calculated.

The average error of deviation may also be obtained by mathematical calculations which take into account all the variables that will be encountered under bomb dropping conditions.

The range probable error is the product of the range average error and the conversion factor 0.845, obtained from books on ordnance and gunnery.

The deflection probable error is the product of the deflection average error and the conversion factor 0.845.

The probability factor is the allowable error divided by the probable error. The allowable error is the distance from the center of the target to the edge thereof and applies to both range and deflection.

Knowing the probability factor, the single-shot probability either in range (R. S. S. P.) or deflection (D. S. S. P.) may be obtained by referring to tables and charts in ordnance texts or Air Corps Technical School texts. Such a probability table is shown on page 471 of the above-mentioned text on ordnance and gunnery by McFarland.

Referring to Figure 1 of the drawing, an origin point at the lower left corner of the chart, the coordinates of which are (0%, 0), is selected and deflection probable error curves (D. E. P.) drawn from the origin, with the deflection dimension of the target from 0 to 800 feet as ordinates and deflection single shot probability from 0% to 100% as abscissa. Coordinates for points on the D. E. P. curves are determined by the allowable error (comprising one-half the deflection dimension of the target) and the resulting deflection single-shot probability. The single-shot probability—for example, of a target having a deflection dimension of 200 feet and bombing conditions having a D. E. P. of 200 feet—would be determined by dividing one-half the deflection dimension of the target (constituting the allowable error) by the D. E. P. to obtain the probability factor. For this set of conditions, the probability factor would be $$\frac{100}{200} = 0.5$$

By referring to the probability table on page 471 of McFarland's "Ordnance and Gunnery," it will be found that a probability factor of 0.5 has a probability of 0.264, or 26.4%. Thus, the co-ordinates (200, 26.4%) lie on the D. E. P.=200 curve.

From a second origin point, the coordinates of which are (0, 0%), preferably diagonally opposite the first origin point, there are drawn range probability error curves (R. E. P.) having abscissa laid off in the negative sense as range target dimensions from 0 to 800 feet and ordinates laid off in the negative sense as probability factors from 0% to 100%. The points on the R. E. P. curves are determined similarly to the points on the D. E. P. curves, as explained above.

A third set of curves representing the compound single shot probability factor is drawn having deflection probability factors as abscissa and range probability factors as ordinates so that the longitudinal co-ordinates of the deflection single shot probability and range single shot probability represents the compound single shot probability. These curves representing the product of D. S. S. P. and R. S. S. P. are designated C. S. S. P. in Figure 1. Thus, a compound single-shot probability of a 20% D. S. S. P. and a 50% R. S. S. P. would be 20%×50%, which equals 10%. The abscissa for the D. E. P. curves serve as abscissa for the C. S. S. P. curves, while the ordinates for the R. E. P. curves serve as ordinates for the C. S. S. P. curves.

It may be well to explain that the probable error curves have been made "second degree" curves so that they are relatively steep in the greater used portions thereof. This is accomplished graphically by first plotting the probable error curves with allowable errors (½ target dimension) as ordinates and probability factors as abscissa, both on a uniformly graduated scale. Since the probability factor is the ratio of allowable error to probable error, probable error curves are straight lines. Referring to text books on ordnance and gunnery, percentage probability is derived from an equation containing the probability factor, the equation being such that the interval between successive percentage probability values varies logarithmically for a given interval between probability factors.

Continuing with the explanation of the graphical solution, values of percentage probability are then placed in corresponding positions with values of probability factors from which they are derived. For example, factors such as .2, .4, .6, .8, etc., are positioned correspondingly with percentage probabilities of 10.7, 21.3, 31.4, 41.1, etc. (these corresponding values being obtainable from probability tables in text books on ordnance and gunnery). The probable error curves are then changed from straight-line curves to curves of the second degree by plotting values of percentage probability at equal intervals as abscissa, using target dimension (twice allowable error) spaced at equal intervals as ordinates and correspondingly plotting the probable error values obtained from the probable error straight-line curves.

In using the computer shown in Figure 1, the single shot deflection probability is determined by locating the abscissa corresponding to the deflection dimension of the target and the deflection probable error. Similarly, the single shot range probability is determined by locating the abscissa corresponding to the range dimensions of the target and the range probable error. The deflection and range dimensions of the target are known and the probable errors of deflection and range are obtained from tables as previously explained. The compound single shot probability is obtained from the compound single shot probability curves using values of the range and deflection single shot probabilities as ordinates and abscissa respectively to locate the compound single shot probability. Reading of the chart in Figure 1 is facilitated by indexing means comprising straight-edges, pointers or the like which may or may not be carried by the member constituting the chart.

Referring to Figures 2 and 3 of the drawings, chart 2 is practically identical with chart 1 of Figure 1. This chart is slidably received in a member 3 having a window opening 4. The deflection single shot probability or, in other words, the abscissa, the co-ordinating ordinates of which represent the deflection dimension of the target, is laid off adjacent the lower edge of the window. The range dimension of the target, comprising abscissa, the co-ordinating ordinates of which represent range single shot probability, is laid off adjacent the upper edge of the window opening. Operatively associated with the window opening 4 is an indexing member 5, constructed of Celluloid or other suitable material and having thereon a vertical and a horizontal reference line. The indexing member 5 is suitably supported and guided for lateral sliding movement by support members 6 and 7, suitably fastened by means of glue or the like to member 3. Member 5 is bent at its upper and lower edge to provide tabs 8 and 9, which are slidably received in openings 10 and 11 of members 6 and 7, respectively.

In using the device, having the known deflection dimension of the target and the deflection probable error, chart 2 is adjusted in member 3 so that the horizontal line on member 5 coincides with the given deflection dimension of the target and the vertical line on member 5 coincides with the deflection probable error for the given conditions. The deflection single shot probability will, for this set of conditions, be obtained by reading the percentage numerals adjacent the lower edge of the window. Thus, for a deflection dimension of target of 400 feet and a deflection probable error of approximately 170 feet there will result a deflection single-shot probability of approximately 60%.

Similarly, setting slide 5 so that the vertical line thereon coincides with the range dimension of the target adjacent the upper edge of the window and the horizontal line of member 5 coincident with the range probable error for the conditions assumed, the range single shot probability is percentage designation adjacent the right hand edge of the chart. Thus, for a range dimension of target of approximately 500 feet and a range probable error of 125 feet, the range single-shot probability would be 80%.

The compound single shot probability is obtained by adjusting chart 2 in such a manner that the range single shot probability coincides with the horizontal cross line on member 5 and the deflection single shot probability coincides with the vertical line of member 5. The point of intersection of the horizontal and vertical lines on member 5 indicates on the percentage curves on the chart the compound single shot probability. Thus, a D. S. S. P. of 60% and a R. S. S. P. of 80% would result in a C. S. S. P. of approximately 48%, obtained by interpolation of the C. S. S. P. curves.

Having obtained the single shot probability, the number of bombs required to obtain a desired degree of certainty of success can be determined. This number is equal to the quotient of the division of the logarithm of one minus the certainty of success by the logarithm of one minus the compound single shot probability in accordance with the following equation:

$$n = \frac{\log(1-P)}{\log(1-a)}$$

in which $n$ is the number of bombs required, $P$ is the percentage of certainty of success, $a$ is the compound single shot probability. These data are tabulated in the form of a chart so that, having the compound single shot probability percentage and the degree of certainty desired, the required number of bombs can be readily determined. For example, if it is desired to know the number of bombs required to a degree of certainty of 80%, when the compound single-shot probability is 34%, the above equation would become $$n = \frac{\log(1-.80)}{\log(1-.34)}$$

which, when solved, would equal 5.

The computer can be made in a variety of ways, for instance, the ordinates and abscissa of each curve could be reversed, or the abscissa arranged adjacent different windows or adjacent the upper and lower edges of the stationary member. Also, one or both of the members could be made of Celluloid or other transparent material having indexing lines thereon, thereby eliminating the indexing member 5.

It is to be understood that the description is by way of example only and that the scope of the invention is to be limited only by the appended claims.

I claim:

1. A probability computer comprising a stationary member and a movable member operatively associated therewith to slide relatively thereto, a set of indicia representing percentage of probability arranged on one of said members, another set of indicia representing units of measure arranged on the other of said members, one set of said indicia being arranged as abscissa in a positive sense and the other set of indicia being arranged as ordinates in a positive sense, and curves arranged on one of said members representing probable error factors, said curves being drawn from the origin of co-ordinates established by said ascissa and ordinates, another set of indicia representing units of measure arranged on said one of said members, another set of indicia representing percentage of probability arranged on said other of said members, said last-named indicia being on the same scale modulus as said first-named indicia, one of the last-named sets of indicia being arranged as abscissa in a negative sense and the other of the last-named sets of indicia being arranged as ordinates in a negative sense establishing an origin of co-ordinates diagonally opposite said first origin of co-ordinates, probable error curves drawn on the member bearing the first named set of curves and from said second origin of co-ordinates and in a negative sense, and a third set of curves each of which has the value represented thereby recorded thereon representing compound single-shot probability arranged on said other of said members with said above-mentioned ordinates in a negative sense as ordinates and said above-mentioned abscissa in a positive sense as abscissa.

2. A probability computer comprising a member having thereon a system of Cartesian co-ordinates, probable error curves emanating from a point of origin of said system, the co-ordinates of said points on said curves representing, respectively, units of measure and percentage of probability, whereby percentage of probability may be obtained for each distance, a second origin point on said member diagonally opposite said first origin point, a system of probable error curves emanating from said second origin point in a negative sense from said first curves, the co-ordinates of points on said last named curves representing percentage of probability and units of measure, whereby percentage of probability may be obtained for each distance, said two sets of curves being oppositely arranged so that the percentage of probability of one is arranged as ordinates and the percentage of probability of the other is arranged as abscissa, and compound probability curves on said member, the ordinates of which are those of said first probable error curve and the abscissa of which are those of the second probable error curve, whereby compound percentage of probabilities may be obtained, said computer being formed of two relatively movable members, one of which has the curves and the ordinates plotted thereon, and the other of which has abscissa plotted thereon.

CHARLES G. WILLIAMSON.